US011549579B2

United States Patent
Casagrande et al.

(10) Patent No.: US 11,549,579 B2
(45) Date of Patent: Jan. 10, 2023

(54) PULLEY-TORSIONAL DAMPER INTEGRATED GROUP

(71) Applicant: DAYCO EUROPE S.R.L., Chieti (IT)

(72) Inventors: Giacomo Casagrande, Cepagatti (IT); Mattia Roberto De Luca, Chieti (IT); Miriam Nardone, Chieti (IT); Roberto Ronchetto, Cuorgne (IT)

(73) Assignee: Dayco Europe S.R.L, Chieti (IT)

( * ) Notice: Subject to any disclaimer, the term of this patent is extended or adjusted under 35 U.S.C. 154(b) by 1081 days.

(21) Appl. No.: 16/303,699

(22) PCT Filed: May 25, 2017

(86) PCT No.: PCT/IB2017/053091
§ 371 (c)(1),
(2) Date: Nov. 21, 2018

(87) PCT Pub. No.: WO2017/203465
PCT Pub. Date: Nov. 30, 2017

(65) Prior Publication Data
US 2020/0332875 A1    Oct. 22, 2020

(30) Foreign Application Priority Data
May 25, 2016   (IT) .................. 102016000053950

(51) Int. Cl.
*F16H 55/36*   (2006.01)
*F16F 15/126*   (2006.01)

(52) U.S. Cl.
CPC ........... *F16H 55/36* (2013.01); *F16F 15/126* (2013.01); *F16F 2224/025* (2013.01); *F16F 2226/042* (2013.01); *F16H 2055/366* (2013.01)

(58) Field of Classification Search
CPC .. F16H 55/36; F16H 2055/366; F16F 15/126; F16F 15/136; F16F 15/1442; F16F 2224/025; F16F 2226/042; Y10T 74/2131
See application file for complete search history.

(56) References Cited

U.S. PATENT DOCUMENTS 5,453,056 A * 9/1995 Ullrich .................... F16H 55/44
474/902
6,171,194 B1 * 1/2001 Haga ....................... F16D 3/52
464/903
(Continued)

FOREIGN PATENT DOCUMENTS

| EP | 1079140 A1 | 2/2001 | |
| EP | 1176337 A1 * | 1/2002 | ............ F16F 15/126 |
| JP | S6111228 A | 1/1986 | |

OTHER PUBLICATIONS

WO, International Search Report and Written Opinion; International Application No. PCT/IB2017/053091 (dated Sep. 8, 2017).

*Primary Examiner* — Daniel D Yabut
(74) *Attorney, Agent, or Firm* — FisherBroyles, LLP; Susan M. Oiler

(57) ABSTRACT

Pulley-torsional damper integrated group comprising a hub adapted to be rigidly connected to a drive member and a pulley connected to the hub. The hub comprises an inner tubular wall and an outer tubular wall. The pulley is angularly coupled to said hub by means of the ring made of elastomeric material. The elastomeric ring has an outer surface towards the pulley and an inner surface towards the hub, and an adhesive is arranged on at least one of the outer or inner surfaces.

9 Claims, 1 Drawing Sheet

(56) References Cited

U.S. PATENT DOCUMENTS 6,984,432 B2 1/2006 Tagawa et al.
2009/0145261 A1 6/2009 Obeshaw

* cited by examiner

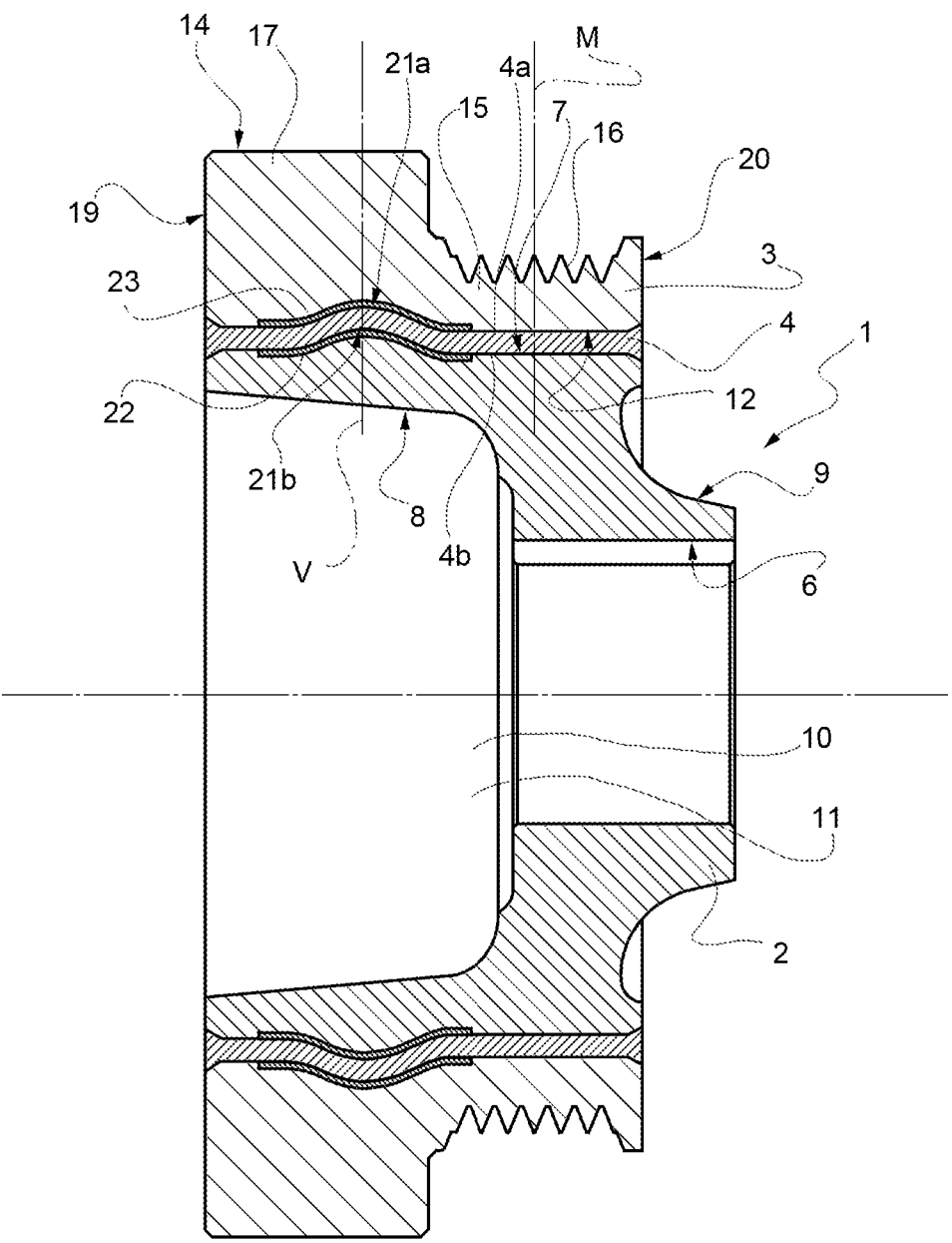

PULLEY-TORSIONAL DAMPER INTEGRATED GROUP

CROSS-REFERENCE TO RELATED APPLICATIONS

The present invention is filed under 35 U.S.C. § 371 as the U.S. national phase of International Patent Application No. PCT/IB2017/053091, filed May 25, 2017, which designated the United States and which claims the benefit of Italian Patent Application No. 102016000053950, filed May 25, 2016 which is hereby incorporated in its entirety including all tables, figures, and claims.

TECHNICAL FIELD

The present invention concerns a pulley-torsional damper integrated group.

In particular, the present invention concerns a pulley-torsional damper integrated group for the drive shaft of a motor vehicle with a combustion engine; the following description will make explicit reference to said use without any loss of generality.

PRIOR ART

Pulley-torsional damper integrated groups are known which comprise a hub adapted to be rigidly connected to a drive member, for example a drive shaft of an internal combustion engine, a pulley connected to the hub by means of a first ring of elastomeric material functioning as a filter for the torsional oscillations, and a seismic ring connected to the hub by means of a second ring of elastomeric material defining with the seismic ring a damper system.

Different ways for producing an integrated hub pulley group are known.

Generally, the elastomeric ring is simply inserted between hub and pulley and therefore remains in its seat by simple friction. In this case, however, the elastomeric ring is not fixed and can move axially, even slightly. Said small movements are the cause of possible micro cracks due to which the damping effect is reduced. Furthermore, over time, due to the continuous stress on the ring and continuous slight axial movements, breakage of the ring itself and therefore of the entire group can occur.

SUMMARY OF THE INVENTION

The object of the present invention is the production of an improved pulley-damper integrated group, which can be produced with ease and which has a reduced possibility of breakage of the ring made of elastomeric material.

The above-mentioned object is achieved by a pulley-damper integrated group that has a hub with an inner tubular wall and an outer tubular wall and is adapted to be rigidly connected to a drive member and has a pulley angularly connected to the hub by an elastomeric ring that has an outer surface towards the pulley and an inner surface towards the hub. An adhesive is present on the outer surface and/or the inner surface of the elastomeric ring and extends axially to cover 90% or less of the axial extension thereof.

BRIEF DESCRIPTION OF THE DRAWINGS

For a better understanding of the present invention, it is now described also with reference to the attached FIGURE which illustrates:

FIG. 1 is a perspective view of a pulley-damper integrated group according to the present invention.

DISCLOSURE OF THE INVENTION

With reference to the FIGURE, the number 1 indicates overall a pulley-torsional damper integrated group according to the present invention.

The group 1 comprises a hub 2, adapted to be rigidly connected to a drive member not shown, for example a drive shaft or a gear of the distribution rigidly secured thereto, a pulley 3 angularly coupled to the hub 2 by means of a ring 4 of elastomeric material functioning essentially as a filter for the torsional oscillations.

More specifically, the hub 2 is made of pressed sheet metal and comprises integrally an inner tubular wall 6 extending axially on the opposite side of the drive member, an outer tubular wall 7, a flat top wall 8 integrally connecting the tubular walls 6 and 7 to each other and a bottom wall 9 opposite the top wall. The walls 6, 7 and 8 form overall an annular coupling portion 10 of the hub 2, which has a substantially open C-shaped section and defines an annular cavity 11.

Preferably the outer tubular wall 7 is substantially flat, more preferably it has a convex portion 21a or also a projecting portion, as shown in FIG. 1.

The pulley 3, expediently of the multiple groove or poly-V type, is expediently made of sheet metal by means of successive pressing and rolling operations and comprises an inner tubular wall 12 facing towards the hub 2 and a substantially cylindrical peripheral crown 15, defining on an own outer surface 14 a plurality of V grooves 16 symmetrical with respect to a median plane M. The pulley further comprises a preferably substantially flat engine wall 19 which connects the outer surface 14 and the crown 15 and faces towards the drive member, and a wall 20 opposite also substantially flat and opposite the wall 19.

Preferably the inner tubular wall 12 of the pulley has a substantially flat shape, more preferably it has a curve or even more preferably at least a concave or hollow portion 21b, as shown in FIG. 1.

The concave portion 21b is clearly in a position corresponding to the convex or projecting portion 21a.

In the FIGURE, V is the axis that passes between the vertexes of the concave portion 21b and the convex portion 21a.

The concave portion 21b and the corresponding convex portion 21a extend axially for approximately one third of the width of the hub 2 or of the pulley 3 and have an approximate C shape facing towards the hub or more preferably the shape of a widened Gaussian curve.

The depth of the concave portion 21b and therefore the height of the corresponding convex portion 21a is approximately 0.5 to 4 mm.

By height we mean maximum height.

The vertex of the convex portion 21a is preferably closer to the engine wall 19 than to the opposite wall 20, even more preferably at a distance between one fifth and half, more preferably approximately one third, of the distance between the wall 19 and the wall 20, where the distance is calculated starting from the wall 19 and the distance is at least 10 mm from both the wall 19 and the wall 20. Preferably the distance ranges between 10 and 20 mm, more preferably between 12 and 18 mm, for example 15 mm.

The elastomeric ring 4 has a tubular shape with an axial extension similar to those of the hub and the pulley and has an outer surface 4a facing towards the pulley and an inner surface 4b. The elastomeric ring 4 is inserted between the outer tubular wall 7 of the hub 2 and the inner tubular wall 12 of the pulley 3 and is kept in contact with the walls by means of at least one first adhesive 22, 23 preferably arranged on at least one of the outer surfaces 4a towards the pulley or inner surface 4b towards the hub of the ring 4.

A second adhesive 23 is advantageously arranged on the other surface.

Preferably, the first adhesive 22 and the second adhesive 23 are the same.

The adhesive 22, 23 is preferably spread or sprayed on the outer surface and/or on the inner surface of the elastomeric ring.

Preferably the adhesive 22, 23 is arranged on the elastomeric ring 4 before the ring is inserted during the assembly of the pulley-damper group between hub 2 and pulley 3.

Preferably the elastomeric ring 4 is inserted between hub 2 and pulley 3 by simple pressure.

The presence of the adhesive 22, 23 allows blocking of the ring 4 on the hub 2 and on the pulley 3 and the reduction or elimination of the slight axial movements of the ring itself, reducing or eliminating the risk of cracking or breakage.

The presence of an adhesive 22, 23 covering the entire axial extension of the outer and/or inner surface of the elastomeric ring 4 allows optimal blocking of the elastomeric ring 4 in its seat, but makes the insertion phase of the elastomeric ring 4 very difficult.

By axial extension the distance between the engine wall 19 of the hub and the opposite wall 20 is extended.

For this reason the adhesive 22, 23 or the adhesives are arranged more preferably only on a portion of the axial extension of one or both of the surfaces of the ring which will come into contact with the pulley and hub.

In a preferred embodiment of the present invention the first adhesive 22, 23 extends preferably for less than 90%, more preferably less than 75% of the axial extension of a surface of the elastomeric ring, more preferably the adhesive is present on both the surfaces, but extends for less than 90% of the axial extension of each surface of the elastomeric ring 4.

More preferably the first adhesive extends between 10 and 75% of the axial extension of at least one surface of the elastomeric ring 4, even more preferably between 20 and 65%.

According to a preferred embodiment of the present invention shown in FIG. 1, the adhesive is arranged only in a central zone in the area of the concave portion 21a and/or of the convex portion 21b for an axial extension equal to that of the convex portion 21a more or less 20% of the axial extension and at least on one side.

Even more preferably the adhesive extends over the entirety of the convex portion 21a and the concave portion 21b, and therefore on both the surfaces 4a and 4b, it also extends for approximately 2 mm beyond the concave portion 21b and the convex portion 21a and on both sides of it.

Preferably the elastomeric ring 4 is made of a relatively "soft" elastomeric material, i.e. with a sufficiently low elastic modulus, for example an elastomer; the resulting high torsional deformability allows "filtering" of the impulse variations of drive torque and resistant torque, creating a sort of "elastic joint" between the pulley 3 and the hub 2.

Preferably the elastomeric ring comprises a material selected from the group consisting of natural rubber (NR), polychloroprene (CR), acrylonitrile butadiene rubber (NBR) and relative hydrogenated elastomers known as hydrogenated acrylonitrile butadiene rubber (HNBR) or zinc salts of hydrogenated acrylonitrile butadiene rubber grafted with esters of unsaturated carboxylic acid, polyisoprene, styrene butadiene rubbers, ethylene-alpha-olefin elastomers, EPDM, polyurethane, fluoroelastomers, ethylene acrylic elastomers (AEM), bromobutyl, chlorosulphonated polyethylene (CSM) or alkyl-chlorosulphonated, chlorinated polyethylene, epoxidized natural rubber, SBR, carboxylated NBR, carboxylated HNBR, ACM, silicone, silicone-based compounds and mixtures thereof.

Advantageously the elastomeric material is present in the ring as "principal elastomer" or it is present in the body compound in an amount of over 50% by weight calculated on the total weight of all the elastomers in the compound therefore excluding all the other non-elastomeric components of the belt.

More preferably the elastomeric ring is chosen from the group consisting of EPDM, AEM, HNBR, Silicone even more preferably is made in EPDM, optionally loaded.

The adhesive 22, 23 is typically an adhesive suitable for gluing metals and elastomers, preferably an adhesive of the Cillbond or Chemosil series, for example a Cillbond 89ET. From an examination of the characteristics of the pulley-damper group 1 produced according to the present invention, the advantages it offers are evident.

In particular it allows easy fixing of the elastomeric ring, but at the same time guaranteeing the avoidance of micro cracks and movements of the ring which could cause breakage.

In particular, furthermore, the solution is particularly easy to implement.

Lastly, the preferred embodiment of the invention, in which the adhesive is present only in a portion of the axial extension of the elastomeric ring, further facilitates insertion of the ring while maintaining all the advantages of the presence of the adhesive.

The invention claimed is:

1. A pulley-torsional damper integrated group comprising:
a hub (2) adapted to be rigidly connected to a drive member,
a pulley (3) connected to the hub (2),
said hub (2) comprising an inner tubular wall (6) and an outer tubular wall (7),
said pulley being angularly coupled to said hub by a ring (4) made of elastomeric material, said ring having an outer surface (4a) towards the pulley and an inner surface (4b) towards the hub,
wherein an adhesive (22, 23) is arranged on at least one of said outer or inner surfaces of said ring made of elastomeric material and extends axially for a percentage lower than 90% of the axial extension of said outer surface (4a) and/or inner surface (4b).

2. The pulley-torsional damper integrated group according to claim 1 wherein said adhesive (22, 23) is present on both the outer and inner surfaces (4a, 4b) of said ring (4).

3. The pulley-torsional damper integrated group according to claim 1, adhesive (22, 23) extends for a percentage comprised between 10 and 75% of the axial extension of said ring (4).

4. The pulley-torsional damper integrated group according to claim 1, said adhesive (22, 23) extends for a percentage comprised between 20 and 65% of the axial extension of said ring (4).

5. The pulley-torsional damper integrated group according to claim 1, said outer tubular wall (7) of said hub (2) comprises a convex portion (21a).

6. The pulley-torsional damper integrated group according to claim 1, said convex portion (21a) has the form of a Gaussian curve.

7. The pulley-torsional damper integrated group according to claim 1, said convex portion (21a) has a height of between 0.5 and 4 mm.

8. Pulley-torsional damper integrated group according to claim 1, said adhesive (22, 23) is arranged on at least one surface and only in a corresponding area of a convex portion (21a) and/or of a corresponding concave portion (21b) present on an internal tubular wall (12) of said pulley (3) and in that said adhesive extends for an axial extension equal to that of the concave portion (21a) and/or the convex portion (21b) plus or minus 10%.

9. The pulley-torsional damper integrated group according to claim 1, said ring (4) comprises at least one material selected from the group consisting of natural rubber (NR), polychloroprene (CR), acrylonitrile butadiene rubber (NBR) and relative hydrogenated elastomers known as hydrogenated acrylonitrile butadiene rubber (HNBR) or zinc salts of hydrogenated acrylonitrile butadiene rubber grafted with esters of unsaturated carboxylic acid, polyisoprene, styrene butadiene rubbers, ethylene-alpha-olefin elastomers, EPDM, polyurethane, fluoroelastomers, ethylene acrylic elastomers (AEM), bromobutyl, chlorosulphonated polyethylene (CSM) or alkyl-chlorosulphonated polyethylene, chlorinated polyethylene, epoxidized natural rubber, SBR, carboxylated NBR, carboxylated HNBR, ACM and mixtures of these compounds.

* * * * *